United States Patent
Mills et al.

(10) Patent No.: US 10,446,033 B2
(45) Date of Patent: Oct. 15, 2019

(54) VEHICLE DETECTION AND AVOIDANCE

(71) Applicant: Ford Global Technologies, LLC, Dearborn, MI (US)

(72) Inventors: Aaron L. Mills, Ann Arbor, MI (US); Gopichandra Surnilla, West Bloomfield, MI (US); Chet Hearn, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 64 days.

(21) Appl. No.: 15/713,248

(22) Filed: Sep. 22, 2017

(65) Prior Publication Data

US 2019/0096255 A1 Mar. 28, 2019

(51) Int. Cl.

| G08G 1/16 | (2006.01) |
| --- | --- |
| B60T 7/22 | (2006.01) |
| B60T 7/18 | (2006.01) |
| G01S 17/00 | (2006.01) |
| G01S 15/00 | (2006.01) |
| G01S 13/93 | (2006.01) |
| H04W 84/00 | (2009.01) |

(52) U.S. Cl.
CPC ............ *G08G 1/162* (2013.01); *B60T 7/18* (2013.01); *B60T 7/22* (2013.01); *G01S 13/931* (2013.01); *G01S 15/00* (2013.01); *G01S 17/00* (2013.01); *G08G 1/166* (2013.01); *H04W 84/00* (2013.01); *B60T 2201/022* (2013.01); *G01S 2013/936* (2013.01); *G01S 2013/9364* (2013.01); *G01S 2013/9367* (2013.01)

(58) Field of Classification Search
CPC .......... G08G 1/162; G08G 1/166; B60T 7/22

USPC .......................................................... 701/70
See application file for complete search history.

(56) References Cited

U.S. PATENT DOCUMENTS

| 6,853,919 B2 | 2/2005 | Kellum |
| --- | --- | --- |
| 8,229,663 B2 | 7/2012 | Zeng et al. |
| 8,466,807 B2 | 6/2013 | Mudalige |
| 8,618,952 B2 | 12/2013 | Mochizuki |
| 9,260,059 B2 | 2/2016 | Rayes et al. |
| 9,637,050 B2 | 5/2017 | Miura et al. |
| 2016/0163198 A1* | 6/2016 | Dougherty ............. G08G 1/162 340/905 |
| 2016/0194000 A1* | 7/2016 | Taki ..................... B60T 7/22 701/70 |
| 2016/0203719 A1* | 7/2016 | Divekar ................. B60R 1/00 701/70 |
| 2017/0120906 A1* | 5/2017 | Penilla ............... G05D 1/0011 |
| 2017/0129466 A1* | 5/2017 | Okubo .................. B60Q 1/44 |

OTHER PUBLICATIONS

Obst et al. article entitled "Multi-Sensor Data Fusion for Checking Plausibility of V2V Communications by Vision-Based Multiple-Object Tracking".

* cited by examiner

*Primary Examiner* — Brian P Sweeney
(74) *Attorney, Agent, or Firm* — Frank A. MacKenzie; Bejin Bieneman PLC (57) ABSTRACT

A communication from a second vehicle is received. Upon failing to detect the second vehicle based on first vehicle sensor data, a message indicating a forward collision warning is sent. Upon detecting the second vehicle based on the first vehicle sensor data, the forward collision warning is suppressed and a first vehicle brake is actuated.

20 Claims, 4 Drawing Sheets

VEHICLE DETECTION AND AVOIDANCE

BACKGROUND

Vehicle collisions often occur at intersections of roadways. A vehicle can detect a target vehicle at the intersection. Collision mitigation between the vehicle and the target vehicle may be difficult and expensive to implement. For example, determining a threat assessment on the target vehicle can require data from a plurality of sensors. However, problems arise in operating the vehicle to actuate alerts upon receiving data from the sensors, providing a nuisance to vehicle users. One problem is an inability to differentiate and evaluate data received from the sensors.

DETAILED DESCRIPTION

A system for a first vehicle includes a computer programmed to receive a communication from a second vehicle, upon failing to detect the second vehicle based on first vehicle sensor data, send a message indicating a forward collision warning, and upon detecting the second vehicle based on the first vehicle sensor data, suppress the forward collision warning and actuate a first vehicle brake.

The computer can be further programmed to determine a threat level of the second vehicle and, upon failing to detect the second vehicle, to send the message indicating the forward collision warning when the threat level of the second vehicle exceeds a threat threshold. The computer can be further programmed to, upon detecting the second vehicle, actuate the brake until the threat level drops below the threat threshold.

The computer can be further programmed to determine a time to collision between the first and second vehicles, and to send the message indicating the forward collision warning when the time to collision is greater than a time threshold.

The computer can be further programmed to determine a time to collision between the first and second vehicles, and to actuate the brake when the time to collision is less than a time threshold.

The computer can be further programmed to receive data about the second vehicle in the communication including at least one of a speed, a heading, and a location of the second vehicle. The computer can be further programmed to determine a threat level for the second vehicle based on the data in the communication.

The computer can be further programmed to send the message with the forward collision warning after actuating the first vehicle brake.

The computer can be further programmed to, upon detecting the second vehicle, project a trajectory of the second vehicle and to actuate the brake based on the projected trajectory.

The computer can be further programmed to determine a range for a sensor to collect data about the second vehicle, and to determine that the sensor has failed to detect the second vehicle when the location data from the communication from the second vehicle is within the range of the sensor and the collected data do not identify the second vehicle within the range of the sensor.

A method includes receiving a communication from a second vehicle, upon failing to detect the second vehicle based on first vehicle sensor data, sending a message indicating a forward collision warning, and, upon detecting the second vehicle based on the first vehicle sensor data, suppressing the forward collision warning and actuating a first vehicle brake.

The method can further include determining a threat level of the second vehicle and, upon failing to detect the second vehicle, sending the message indicating the forward collision warning when the threat level of the second vehicle exceeds a threat threshold. The method can further include, upon detecting the second vehicle, actuating the brake until the threat level drops below the threat threshold.

The method can further include determining a time to collision between the first and second vehicles, and sending the message indicating the forward collision warning when the time to collision is greater than a time threshold.

The method can further include determining a time to collision between the first and second vehicles and actuating the brake when the time to collision is less than a time threshold.

The method can further include receiving data about the second vehicle in the communication including at least one of a speed, a heading, and a location of the second vehicle. The method can further include determining a threat level for the second vehicle based on the data in the communication.

The method can further include sending the message with the forward collision warning after actuating the first vehicle brake.

The method can further include, upon detecting the second vehicle, projecting a trajectory of the second vehicle and actuating the brake based on the projected trajectory.

The method can further include determining a range for a sensor to collect data about the second vehicle, and determining that the sensor has failed to detect the second vehicle when the location data from the communication from the second vehicle is within the range of the sensor and the collected data do not identify the second vehicle within the range of the sensor.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

By suppressing forward collision warnings when other vehicle components are actuated to address a potential collision, a system can reduce the number of nuisance warnings. Furthermore, the system can differentiate between potential collisions with a time to collision that can allow a human operator to react, during which a forward collision warning can be sent, and potential collisions with a time to collision that can allow a vehicle computer to operate components in an autonomous mode, during which a forward collision warning can be a nuisance because the vehicle is already reacting to the potential collision.

A computer in a vehicle can use data collected from vehicle-to-vehicle communication to detect the presence of occluded vehicles. The data in the vehicle-to-vehicle communication may lack the robustness of data from vehicle sensors. The computer can use the data from the vehicle-to-vehicle communication to detect the presence of the occluded vehicle and the data from the vehicle sensors to actuate one or more vehicle components to avoid a collision with the occluded vehicle.

Figure 1:
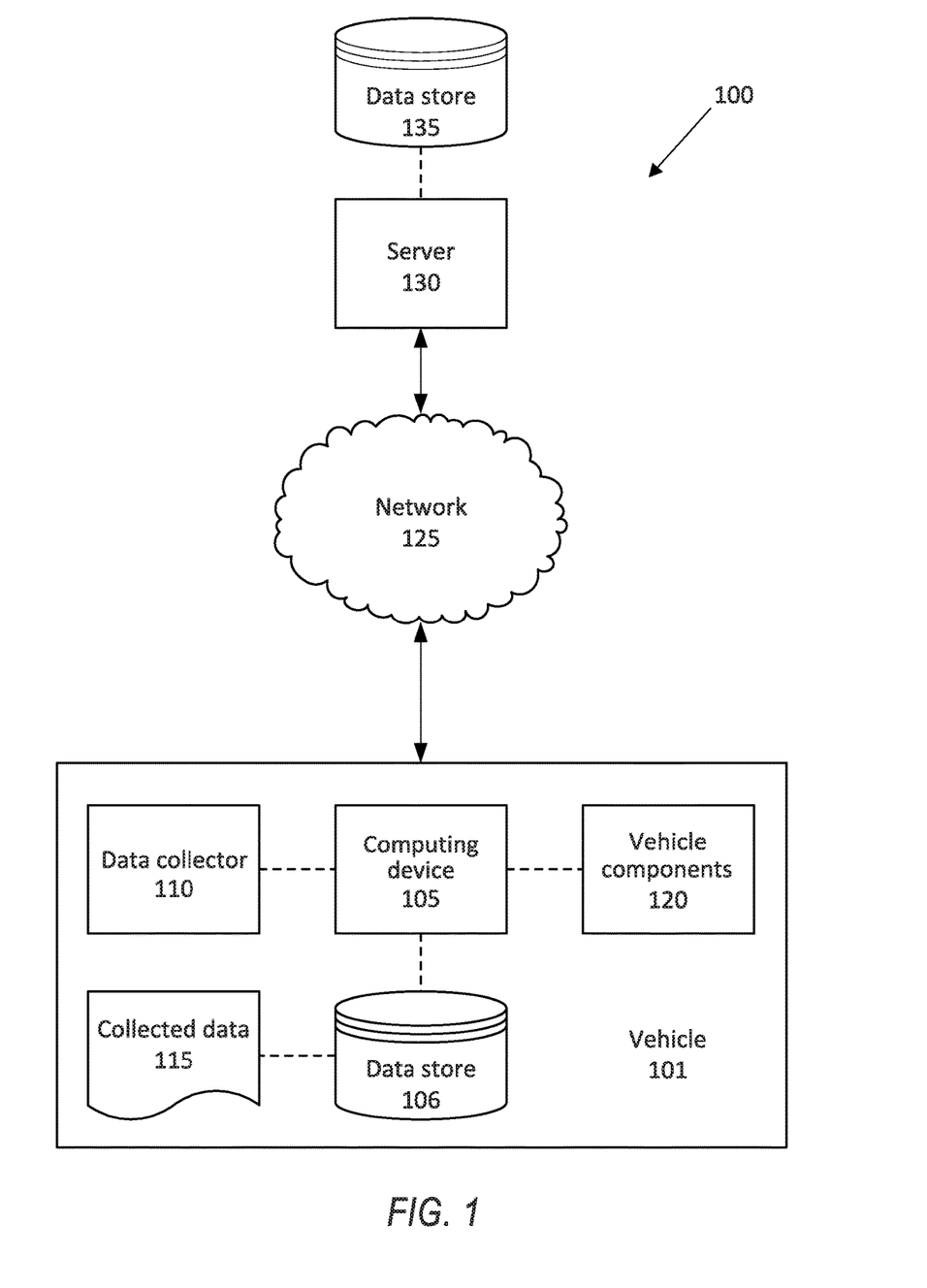
FIG. 1 is a block diagram of an example system for operating a vehicle.

FIG. 1 illustrates an example system 100 for operating a vehicle 101. A computer 105 in the vehicle 101 is programmed to receive collected data 115 from one or more sensors 110. For example, vehicle 101 data 115 may include a location of the vehicle 101, a speed of the vehicle 101, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. The vehicle 101 can include a human-machine interface (HMI) 120, e.g., a display, a touchscreen display, a portable device, etc.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
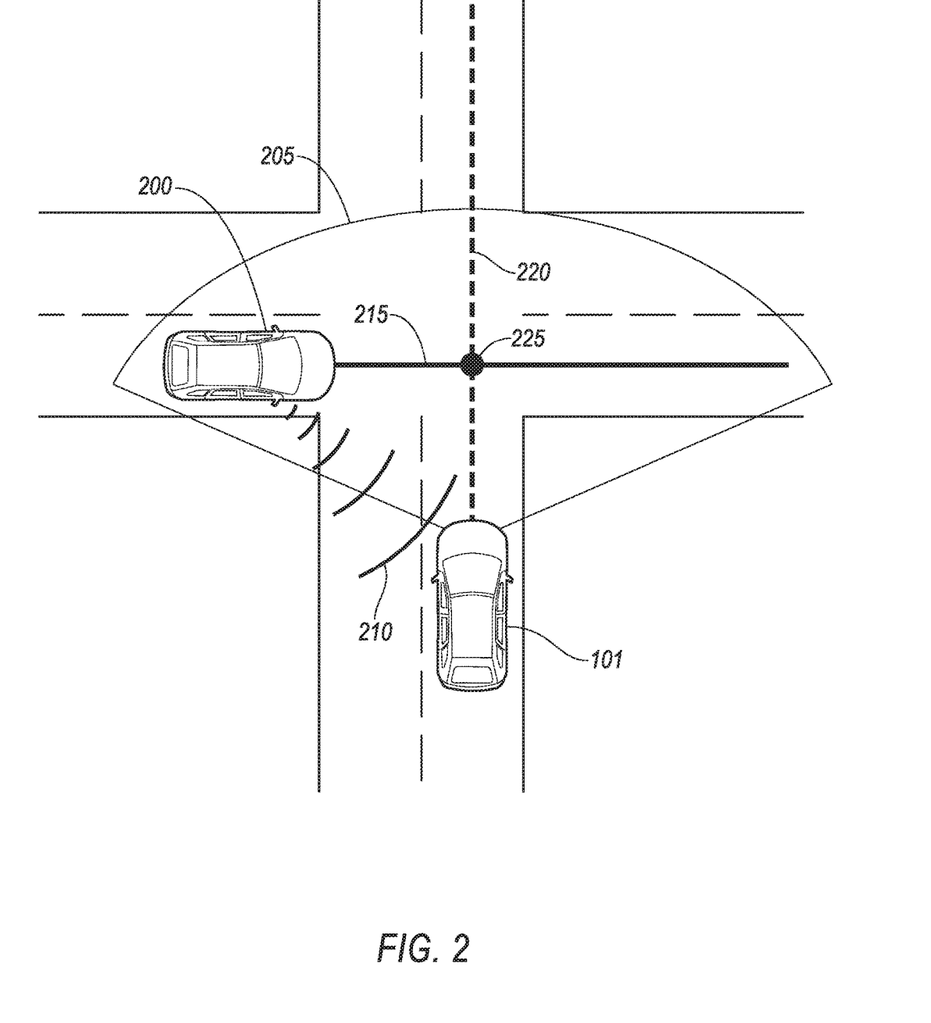
FIG. 2 is a view of the vehicle detecting a target vehicle.

FIG. 2 illustrates a host vehicle 101 and a target vehicle 200 on a roadway. The host vehicle 101 can actuate one or more sensors 110 to detect the target vehicle 200, e.g., an image sensor, a radar, a lidar, an ultrasonic transducer, etc. The sensors 110 can have a range 205. Each sensor 110 can have a maximum distance from the vehicle 101 within which the sensor 110 can collect data 115, i.e., the range 205. The maximum distance for each sensor 110 can be a predetermined value stored in the data store 106 and/or the server 130 and prescribed by, e.g., a sensor 110 manufacturer. That is, for purposes of this disclosure the range 205 is defined such that each sensor 110 can collect data 115 within the range 205 (which, as will be understood, can vary according to conditions such as amount of light, precipitation etc.) as shown in FIG. 2, and at least one sensor 110 cannot collect data 115 at a position outside the range 205. Each sensor 110 can transmit a value indicating the maximum distance to the computer 105, and the computer 105 can determine the range 205 from the stored maximum distances. The computer 105 can store the range 205 in the data store 106 and/or the server 130. Alternatively or additionally, the server 130 can send a message over the network 125 indicating the range 205. When the target vehicle 200 enters the range 205 of the sensors 110, the sensor 110 can collect data 115 about the target vehicle 200 and the computer 105 can detect the target vehicle 200.

The target vehicle 200 can send a message 210 over the network 125 to the host vehicle 101. The target vehicle 200 can send the message 210 with, e.g., DSRC. The message 210 can include data 115 about the target vehicle 200, e.g., a speed, a heading, a location, a size, a brake status, a path history, a predicted path, etc. One or more sensors 110 in the target vehicle 200 can collect data 115, and the message 210 can include the collected data 115. The computer 105 can receive the message 210 from the target vehicle 200. The computer 105 can use the data 115 from the message 210 to determine whether to actuate one or more vehicle components 120. For example, the computer 105 can compare the location of the target vehicle 101, as specified in the message 210, to the location of the host vehicle 101, and can thereby determine a distance between the host vehicle 101 and the target vehicle 200. The computer 105 can determine if the distance between the host vehicle 101 and the target vehicle 200 is greater than the range 205, i.e., whether the target vehicle 200 is outside the range 205. If the target vehicle 200 is outside the range 205, the computer 105 can determine that the target vehicle 200 is not detected and actuate a forward collision warning, as described below.

The computer 105 can be programmed to project a target trajectory 215 of the target vehicle 200 and a host trajectory 220 of the host vehicle 101, collectively, trajectories 215, 220. The computer 105 can project the trajectories 215, 220 based on collected data 115 from the sensors 110. The trajectories 215, 220 can meet at an intersection point 225. The intersection point 225 can be a predicted location at which the host vehicle 101 and the target vehicle 200 can meet, i.e., in a collision. The computer 105 can project the trajectories 215, 220, upon detecting the target vehicle 200.

The computer 105 can be programmed to suppress a forward collision warning upon detecting the target vehicle 200. The computer 105 can generate a plurality of forward collision warnings for a plurality of target vehicles 200, including target vehicles 200 that may not have a risk of colliding with the host vehicle 101, resulting in nuisance warnings. To reduce the nuisance warnings, the computer 105 can be programmed to suppress the forward collision warning when the sensors 110 detect the target vehicle 200, allowing the computer 105 according to pre-collision assist (PCA) programming to actuate one or more components 120 to avoid a potential collision. Furthermore, the computer 105 can be programmed to send the message with the forward collision warning after actuating a brake 120 in the host vehicle 101, i.e., after the PCA programming has actuated the brake 120 and the forward collision warning is not a nuisance warning.

The computer 105 can be programmed to determine a threat level with a threat algorithm using data 115 collected about the host vehicle 101 and the target vehicle 200. The computer 105 can collect data 115 with the sensors 110 on, e.g., a speed, a position, an acceleration, etc., of the host vehicle 101 and the target vehicle 200. Furthermore, the computer 105 can use data 115 in the message 210 sent from the target vehicle 200 to determine the threat level. Based on the collected data 115, the computer 105 can, using a threat algorithm (e.g., known threat calculations), determine a threat level for the target vehicle 200.

Various threat algorithms and techniques for obtaining a threat level, e.g., a "threat number," are known. The threat algorithm can include a function, e.g., a weighted sum, a weighted product, etc., of a plurality of parameters related to the host vehicle 101 and the target vehicle 200. The parameters can include, e.g., a predicted time to collision between the host vehicle 101 and the target vehicle 200, predicted paths of the host vehicle 101 and the target vehicle 200, a predicted lateral acceleration to avoid a collision based on a host vehicle 101 speed, a predicted longitudinal deceleration to avoid a collision based on a host vehicle 101 position and braking power, a predicted host longitudinal acceleration to avoid the collision based on a host vehicle 101 acceleration, a current host vehicle 101 operator state based on a current acceleration, braking, and steering of the host vehicle 101, a predicted target vehicle 200 longitudinal deceleration to avoid the collision based on a current target vehicle 200 acceleration and braking, a predicted target vehicle 200 longitudinal acceleration to avoid the collision based on a current target vehicle 200 speed and acceleration, etc. The threat algorithm can determine a threat level, e.g., a threat number between 0 and 1 that is a probability of a collision between the host vehicle 101 and the target vehicle 200.

Furthermore, the computer 105 can determine the threat level that is based on a shortest distance between the host vehicle 101 and a target vehicle 200, a time rate of change of the shortest distance, and an angle between a host vehicle 101 trajectory and a line along the distance between the host vehicle 101 and the target vehicle 100. Additionally or alternatively, the computer 105 can determine a rotation rate of the host vehicle 101 relative to the roadway (e.g., when the host vehicle 101 is turning) and determining the threat level based on the rotation rate.

The computer 105 can actuate one or more components 120 based on the threat level. For example, the computer 105 can be programmed to actuate a brake 120, e.g., an autonomous emergency brake (AEB) 120, when the threat level exceeds a threat threshold, stopping the host vehicle 101. The computer 105 can actuate the AEB 120 until another value of the threat level determined after actuating the AEB 120 is below the threat threshold. In another example, the computer 105 can actuate a steering 120 in an autonomous mode to steer the host vehicle 101 away from the target vehicle 200. The computer 105 can be further programmed to actuate a steering 120 and a propulsion 120 based on the threat level.

The computer 105 can determine a time to collision between the host vehicle 101 and the target vehicle 200. The time to collision can be a predicted time until the trajectories of the host vehicle and the target vehicle 200 meet, e.g., at the intersection point 225. The computer 105 can, based on the data 115, predict the trajectories of the host vehicle 101 and the target vehicle using known techniques. The computer 105 can send the message indicating the forward collision warning when the time to collision is greater than a time threshold. The computer 105 can actuate the brake when the time to collision is less than a time threshold. The time threshold can be a predetermined value stored in the data store 106 and/or the server 130, and can be determined as, e.g., an average response time of a vehicle 101 operator, e.g., 1 second.

Figure 3:
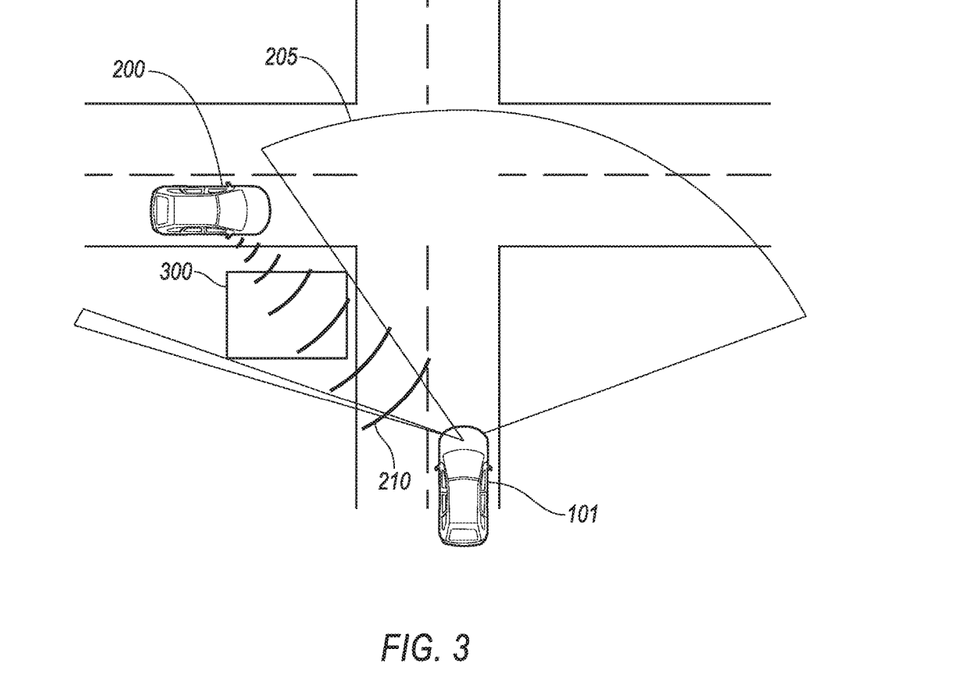
FIG. 3 is a view of vehicle sensors occluded by an object.

FIG. 3 illustrates an example intersection where the target vehicle 200 is occluded from the host vehicle 101. The intersection can include an object 300 that can prevent sensors 110 in the host vehicle 101 from detecting the target vehicle 200. For example, the object 300 can be a building, a utility pillar, etc. As used herein, the target vehicle 200 is "occluded" when the sensors 110 in the host vehicle 101 do not detect the target vehicle 200 and the computer 105 of the host vehicle 101 receives the message 210 from the target vehicle 200. That is, the computer 105 recognizes the presence of the target vehicle 200 from the message 210 but does not detect the target vehicle 200 with the sensor 110.

The computer 105 in the host vehicle 101 can receive the message 210 over the network 125 (e.g., via V2V communications) from the target vehicle 200. That is, the object 300 may not prevent communication over the network 125.

Upon receiving the message from the target vehicle 200, the computer 105 can actuate one or more sensors 110 to detect the target vehicle 200. The object 300 can block the sensors 110 from collecting data 115, e.g., blocking a field of vision of an image sensor 110, reflecting ultrasonic waves and/or radar waves, blocking lasers of a LIDAR 110, etc.

As described above, the sensors 110 can have a range 205 to collect data 115 about the target vehicle 200. The computer 105 can be programmed to determine that the sensors 110 have failed to detect the target vehicle 200 when the location data 115 from the message 210 from the target vehicle 200 is within the range 205 of the sensors 115 and the collected data 115 do not identify the target vehicle 200 within the range 205. The object 300 can limit the range 205 of the sensors 110.

When the computer 105 fails to detect the target vehicle 200 with the sensors 110, the computer 105 can provide a forward collision warning to the user of the host vehicle 101. The computer 105 can send a message indicating the forward collision warning to the user, e.g., on a vehicle 101 HMI, to a user device (e.g., a smartphone, a wearable device, etc.), etc. As described above, the forward collision warning can inform the user that a target vehicle 200 could collide with the host vehicle 101. The computer 105 can be programmed to use the data 115 from the communication with the target vehicle 200 to determine a threat level, as described above. The computer 105 can be programmed to actuate the forward collision warning when the threat level is above a warning threshold.

The example of FIG. 3 illustrates the target vehicle 200 at an intersection. In another example (not shown), the target vehicle 200 and the host vehicle 101 can be travelling in a same roadway lane, and the target vehicle 200 can be occluded by one or more other vehicles between the host vehicle 101 and the target vehicle 200. If the target vehicle 200 suddenly brakes, the host vehicle 101 could fail to detect the sudden braking and collide with the nearest vehicle. The computer 105 can be programmed to communicate with the target vehicle 200 and to actuate the components 120 based on the data 115 from the sensors 110 and from the communication 210 with the target vehicle 200, as described above.

Figure 4:
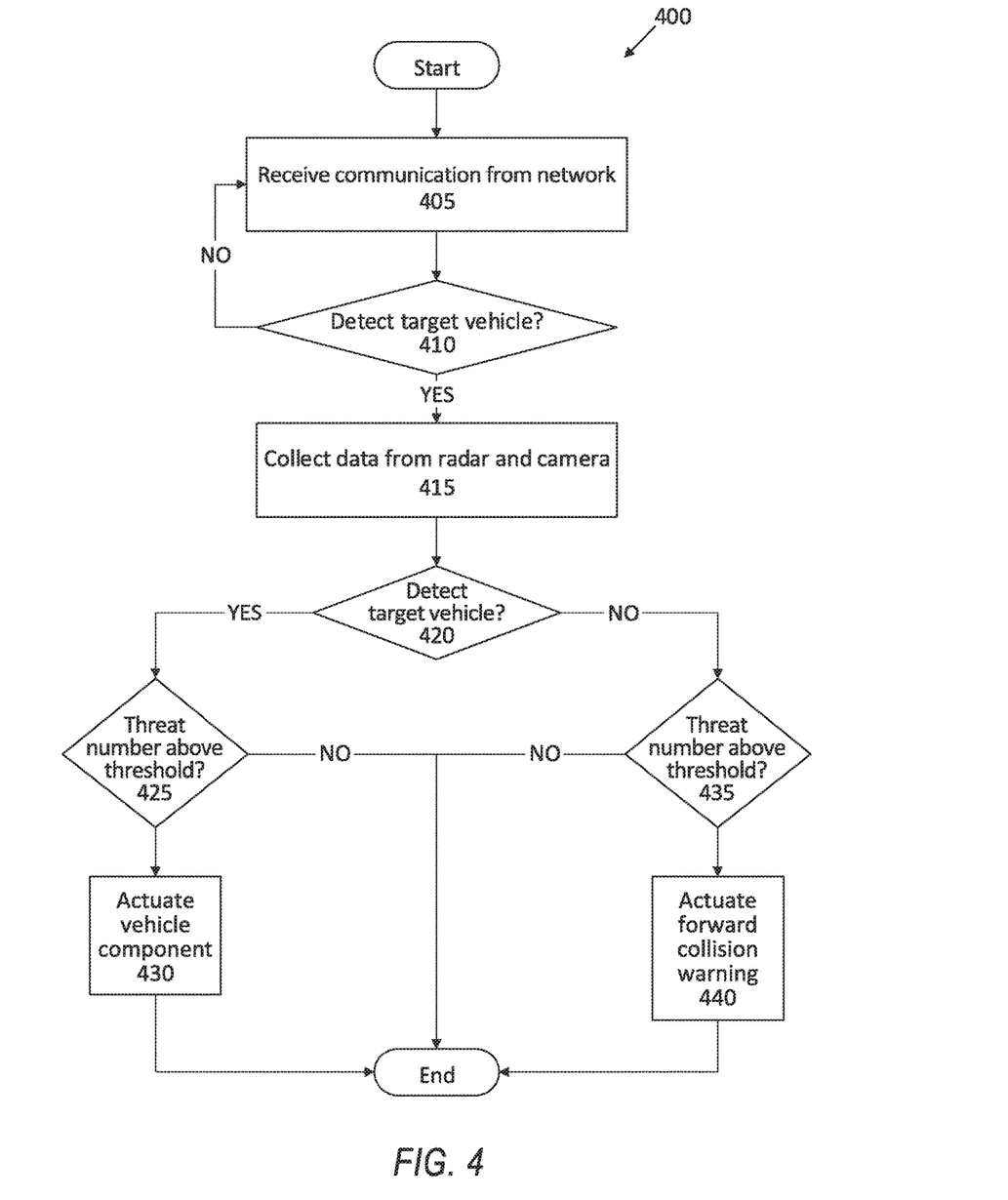
FIG. 4 is a process flow diagram of an example process for operating the vehicle.

FIG. 4 illustrates an example process 400 for detecting a target vehicle 200. The process 400 begins in a block 405, in which the computer 105 receives a communication, e.g., a message 210, over the network 125. As described above, a target vehicle 200 can send a message over the network 125 (e.g., using DSRC) with data 115 about the target vehicle 200 position, speed, trajectory, etc. The computer 105 can receive the message and the data 115.

Next, in a block 410, the computer 105 determines whether a target vehicle 200 is detected. The computer 105 can determine from the communication whether the communication includes a message 210 from a target vehicle 200. If the computer 105 determines that there is a target vehicle 200, the process 400 continues in a block 415. Otherwise, the process 400 returns to the block 405 to receive more communications.

In the block 415, the computer 105 actuates one or more sensors 110, including a radar 110 and/or a camera 110, to detect the target vehicle 200. The computer 105 can collect data 115 with the sensors 110 to detect the target vehicle 200 that sent the message 210 over the network 125, e.g., image data 115, radar data 115, LIDAR data 115, etc.

Next, in a block 420, the computer 105 determines whether the data 115 collected by the sensors 110 allows the computer 105 to detect the target vehicle 200. If the sensors 110 are occluded, e.g., by an object 300 between the host vehicle 101 and the target vehicle 200, the data 115 can fail to indicate the presence of the target vehicle 200. If the target vehicle 200 is not within the range 205 of the sensors 110, the data 115 can fail to indicate the target vehicle 200. If the computer 105 detects the target vehicle 200 based on the data 115, the process 400 continues in a block 425. Otherwise, the process 400 continues in a block 435.

In the block 425, the computer 105 determines whether a threat level for the target vehicle 200 is above a threat threshold. The threat level can be, e.g., a threat number determined by a threat algorithm, as described above. If the threat level is above the threat threshold, the process 400 continues in a block 430. Otherwise, the process 400 ends.

In the block 430, the computer 105 actuates a vehicle component 120. For example, the computer 105 can actuate a brake 120, e.g., an emergency brake 120, to stop the host vehicle 101 prior to colliding with the target vehicle 200 as detected by data 115, a steering 120, e.g., an emergency steering 120, etc. As described above, the computer 105 can actuate the steering 120, the brake 120, and the propulsion 120 to avoid the target vehicle 200. Following the block 430, the process 400 ends.

In the block 435, the computer 105 determines whether a threat level for the target vehicle 200 is above a threat threshold. The threat level can be, e.g., a threat number determined by a threat algorithm, as described above. If the threat level is above the threat threshold, the process 400 continues in a block 440. Otherwise, the process 400 ends.

In the block 440, the computer 105 provides a forward collision warning to a user in the host vehicle 101 based on the received message 210 from the target vehicle 200. As described above, the forward collision warning can be a visual, aural, and/or haptic alert indicating the presence of the target vehicle 200. The computer 105 can provide the forward collision warning on, e.g., a vehicle 101 HMI 120, a portable device such as a smartphone or smartwatch, etc. Following the block 440, the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system for a first vehicle, comprising a computer including a processor and a memory, the memory storing instructions executable by the processor to:
   receive a communication from a second vehicle;
   receive first vehicle sensor data;
   determine whether the second vehicle is detected from the first vehicle sensor data;
   if the second vehicle is not detected based on the first vehicle sensor data, send a message indicating a forward collision warning; and
   if the second vehicle is detected based on the first vehicle sensor data, suppress the forward collision warning and actuate a first vehicle brake.

2. The system of claim 1, wherein the instructions further include instructions to determine a threat level of the second vehicle and, if the second vehicle is not detected, to send the message indicating the forward collision warning when the threat level of the second vehicle exceeds a threat threshold.

3. The system of claim 2, wherein the instructions further include instructions to, if the second vehicle is detected, actuate the brake until the threat level drops below the threat threshold.

4. The system of claim 1, wherein the instructions further include instructions to determine a time to collision between the first and second vehicles, and to send the message indicating the forward collision warning when the time to collision is greater than a time threshold.

5. The system of claim 1, wherein the instructions further include instructions to determine a time to collision between the first and second vehicles, and to actuate the brake when the time to collision is less than a time threshold.

6. The system of claim 1, wherein the instructions further include instructions to receive data about the second vehicle in the communication including at least one of a speed, a heading, and a location of the second vehicle.

7. The system of claim 6, wherein the instructions further include instructions to determine a threat level for the second vehicle based on the data in the communication.

8. The system of claim 1, wherein the instructions further include instructions to send the message with the forward collision warning after actuating the first vehicle brake.

9. The system of claim 1, wherein the instructions further include instructions to, if the second vehicle is detected, project a trajectory of the second vehicle and to actuate the brake based on the projected trajectory.

10. The system of claim 1, wherein the instructions further include instructions to determine a range for a sensor to collect data about the second vehicle, and to determine that the sensor has failed to detect the second vehicle when the location data from the communication from the second vehicle is within the range of the sensor and the collected data do not identify the second vehicle within the range of the sensor.

11. A method executable by a computer in a first vehicle, comprising:
    receiving a communication from a second vehicle;
    receiving first vehicle sensor data;
    determining whether the second vehicle is detected from the first vehicle sensor data;
    if the second vehicle is not detected based on the first vehicle sensor data, sending a message indicating a forward collision warning; and
    if the second vehicle is detected based on the first vehicle sensor data, suppressing the forward collision warning and actuating a first vehicle brake.

12. The method of claim 11, further comprising determining a threat level of the second vehicle and, if the second vehicle is not detected, sending the message indicating the forward collision warning when the threat level of the second vehicle exceeds a threat threshold.

13. The method of claim 12, further comprising, if the second vehicle is detected, actuating the brake until the threat level drops below the threat threshold.

14. The method of claim 11, further comprising determining a time to collision between the first and second vehicles, and sending the message indicating the forward collision warning when the time to collision is greater than a time threshold.

15. The method of claim 11, further comprising determining a time to collision between the first and second vehicles and actuating the brake when the time to collision is less than a time threshold.

16. The method of claim 11, further comprising receiving data about the second vehicle in the communication including at least one of a speed, a heading, and a location of the second vehicle.

17. The method of claim 16, further comprising determining a threat level for the second vehicle based on the data in the communication.

18. The method of claim 11, further comprising sending the message with the forward collision warning after actuating the first vehicle brake.

19. The method of claim 11, further comprising, if the second vehicle is detected, projecting a trajectory of the second vehicle and actuating the brake based on the projected trajectory.

20. The method of claim 11, further comprising determining a range for a sensor to collect data about the second vehicle, and determining that the sensor has failed to detect the second vehicle when the location data from the communication from the second vehicle is within the range of the sensor and the collected data do not identify the second vehicle within the range of the sensor.

\* \* \* \* \*